United States Patent [19]

Moriwaki et al.

[11] 4,199,996
[45] Apr. 29, 1980

[54] PRECISE FEEDING TABLE APPARATUS

[75] Inventors: Yoshinaga Moriwaki, Yokohama; Masashi Kamiya, Tama; Katsunobu Ueda, Yokohama; Masaharu Terashima, Yokohama; Tetsuo Aikawa, Yokohama; Tameyasu Tsukada, Tokyo; Hirosuke Ohshio, Yokohama, all of Japan

[73] Assignee: Tokyo Shibaura Electric Co., Ltd., Japan

[21] Appl. No.: 860,433

[22] Filed: Dec. 14, 1977

[30] Foreign Application Priority Data

Dec. 16, 1976 [JP] Japan .................. 51/150355

[51] Int. Cl.² .................. F16H 27/02; F16H 29/02; F16H 29/20
[52] U.S. Cl. .................. 74/89.15; 74/479; 269/73
[58] Field of Search .................. 74/89.15, 89.14, 479; 269/73; 108/143, 137; 308/DIG. 1, 3 A, 3 C

[56] References Cited

U.S. PATENT DOCUMENTS

| | | | |
|---|---|---|---|
| 2,695,198 | 11/1954 | Brugger | 308/DIG. 1 |
| 3,026,150 | 3/1962 | Buckley et al. | 308/9 |
| 3,030,744 | 4/1962 | Mueller | 308/DIG. 1 |
| 3,115,372 | 12/1963 | Bard | 308/DIG. 1 |
| 3,270,591 | 9/1966 | Winter | 308/3 A X |
| 3,495,519 | 2/1970 | Alfsen et al. | 108/137 |
| 3,613,464 | 10/1971 | Archer | 74/89.15 |
| 3,638,933 | 2/1972 | Burnette | 108/137 X |
| 3,688,642 | 9/1972 | Negoro | 90/13 C |
| 3,691,864 | 9/1972 | Cochran et al. | 74/479 |
| 3,790,155 | 2/1974 | Longamore | 108/137 X |
| 3,994,539 | 11/1976 | Gottlieb | 308/3 A |
| 4,006,645 | 2/1977 | Newell | 74/479 |
| 4,026,536 | 5/1977 | Netto | 269/73 |

FOREIGN PATENT DOCUMENTS

| | | | |
|---|---|---|---|
| 2229380 | 12/1973 | Fed. Rep. of Germany | 108/143 |
| 2346693 | 4/1975 | Fed. Rep. of Germany | 308/DIG. 1 |
| 1309161 | 10/1962 | France | 108/137 |
| 2302448 | 9/1976 | France | 308/3 A |

OTHER PUBLICATIONS

IEEE Transactions on Electron Devices, pp. 385–392, Jul. 1975, vol. ED-22, #7, Herriot et al.
ANORAD Corporation Catalog, "Standard Accessories".
Microelectronics and Reliability, "Problems of Electron Beam Machining in Miniature Circuit Design", Hofman, vol. 4, pp. 59–64, 1965.

*Primary Examiner*—Leslie Braun
*Attorney, Agent, or Firm*—Finnegan, Henderson, Farabow, Garrett & Dunner

[57] ABSTRACT

A precise feeding table apparatus which comprises an XY-table assembly including a Y-table and an X-table mounted thereon. Electric motors for supplying a driving force to feed the X- and Y-tables are set on a base of the table apparatus. A driving shaft of the electric motor for the Y-table takes the form of a ball screw to cause a guide carriage supported by the driving shaft to make a minute reciprocation. A moment derived from the reciprocation of the guide carraige is not directly transmitted to the Y-table. A connection rod moving jointly with the guide carriage is connected to an output shaft fitted to the Y-table by means of a coupling including a fluid bearing. The fluid bearing supports the connecting rod in contactless relationship, thereby preventing the vibrations and moments of the connecting rod from being transmitted to the output shaft.

14 Claims, 9 Drawing Figures

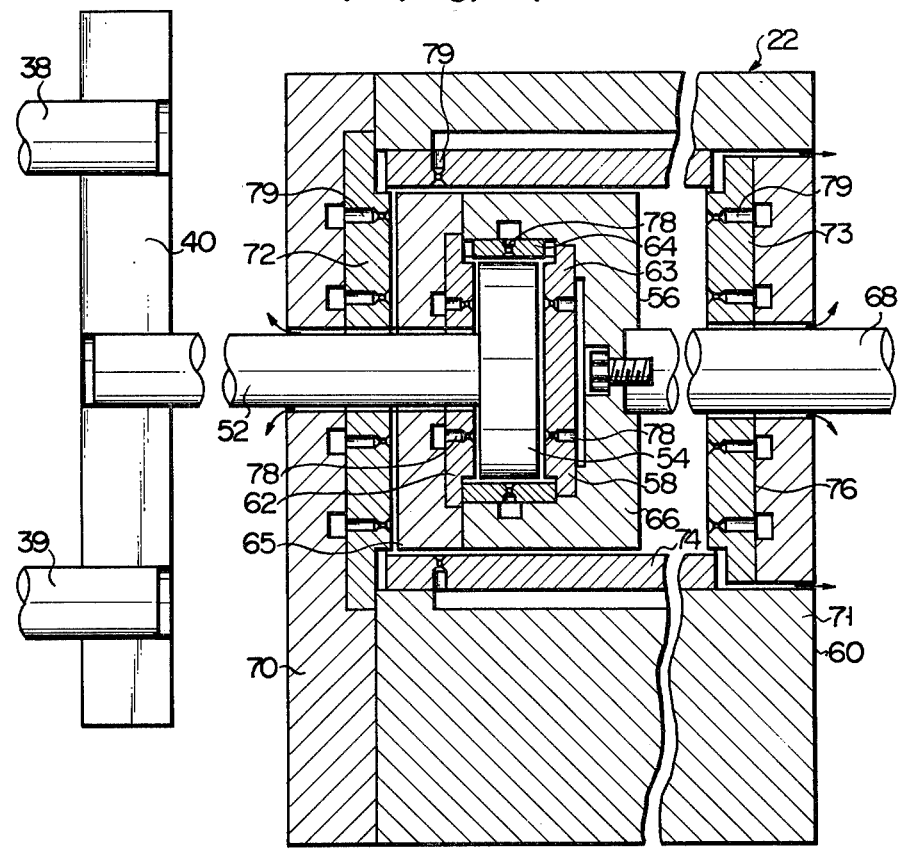
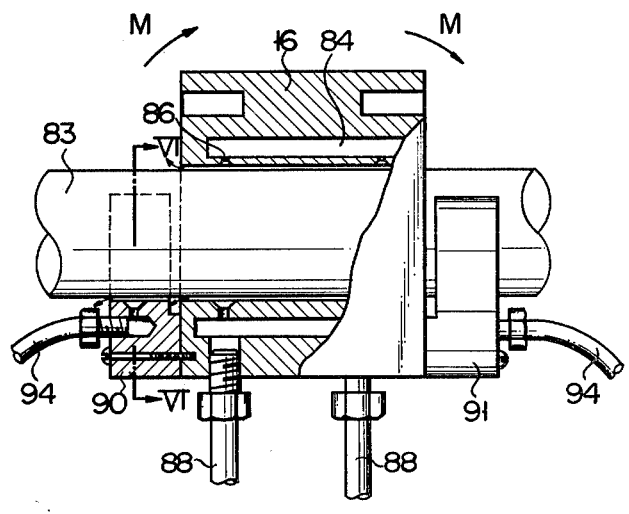
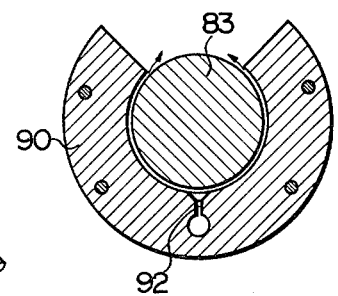

PRECISE FEEDING TABLE APPARATUS

This invention relates to a table apparatus and more particularly to a table apparatus capable of precisely locating a sample or workpiece.

A table apparatus is demanded to have a capacity to locate an XY-table assembly carrying a sample or workpiece precisely at the prescribed position without zigzag movement or irregular feeding. The XY-table assembly of the table apparatus generally comprises a Y-table and an X-table reciprocating along the surface of the Y-table. The rotating movement of a driving shaft derived from a power source such as an electric motor is finally changed into a reciprocating movement by a conversion mechanism. Thus, the reciprocating movement causes the XY-table assembly to be shifted along an X- or Y-axis.

With the known table apparatus, however, the electric motor of the X-table is mounted on the Y-table, with the result that the vibrations of the electric motor are transmitted to the XY-table assembly, preventing a sample or workpiece from being precisely located by the XY-table assembly. Further, the prior art table apparatus generally comprises a journal bearing such as a roller bearing. Consequently, a frictional force occurring between the bearing and journal portion often gives rise to a stack slip and thermal deformation lead to the zigzag movement of the XY-table assembly and the irregular feeding of a sample or workpiece, presenting difficulties in causing the XY-table assembly precisely to locate the sample or workpiece.

There has already been proposed a table apparatus whose XY-table assembly is formed of a single table in order to eliminate the effect of vibrations of an electric motor. With this known table apparatus, X- and Y-guide carriages are reciprocated by the corresponding electric motors. The reciprocating movements of these guide carriages are transmitted to the XY-table assembly by means of the corresponding guide bars. This conventional table apparatus attempts to elevate the precision with which a sample or workpiece is located by eliminating the effect of vibrations of the electric motor. Since, however, the deformation of the guide bar resulting from the use of a journal bearing more noticeably affects the bar, difficulties are presented all the same in precisely locating a sample or workpiece by the XY-table assembly.

It is, accordingly, the object of this invention to provide a table apparatus which suppresses the occurrence of a stick slip and the deformation of a bearing and eliminates the effect of vibrations of a power source such as an electric motor, thereby the precise location of a sample or workpiece.

This invention can be more fully understood from the following detailed description when taken in conjunction with the accompanying drawings, in which:

FIG. 4 is a longitudinal sectional view of coupling means;

FIG. 5 is a fractional exploded front view of a Y-table;

FIG. 6 is a cross sectional view on line VI—VI of FIG. 5;

Figure 1:
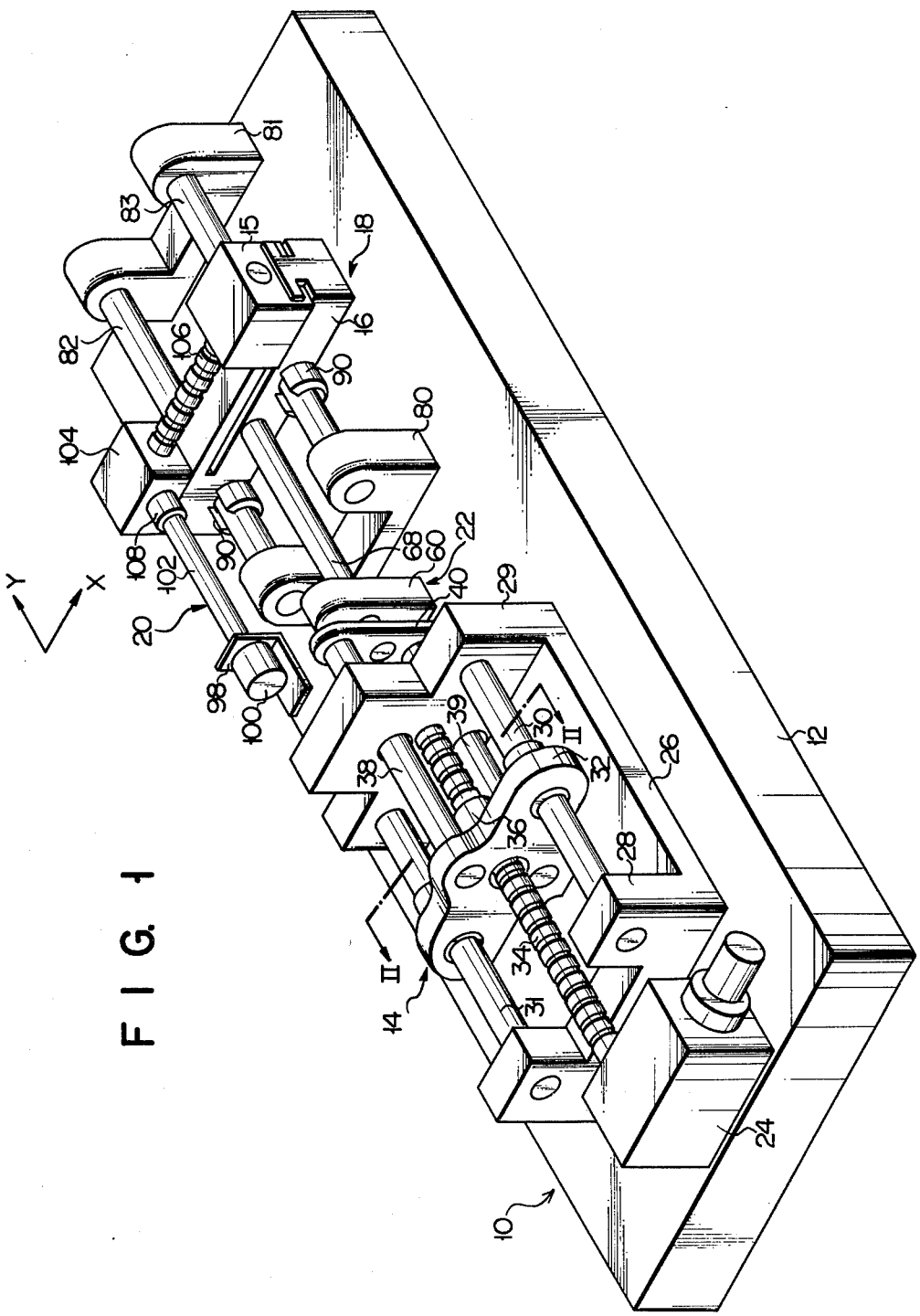
FIG. 1 is a schematic perspective view of a table apparatus according to one preferred embodiment of this invention.

As seen from FIG. 1, a table apparatus 10, according to one embodiment of this invention, comprises a base 12, first precise feeding means 14 for converting a rotating movement derived from a power source into a minute reciprocating movement, and an XY-table assembly 18 including an X-table 15 and a Y-table 16. The Y-table 16 is reciprocated by the first precise feeding means 14. The X-table 15 is reciprocated by a second precise feeding means 20 along an X-axis, that is, in a direction perpendicular to a Y-axis along wich the Y-table 16 is reciprocated. The reciprocating movement supplied by the first precise feeding means 14 is not directly transmitted to the Y-table 16. Namely, the reciprocating movement is indirectly transmitted to the Y-table 16 by coupling means 22 in order to eliminate the effects of various factors such as the vibrations, torsional moments and bending moments of the first precise feeding means 14.

As apparent from FIG. 1, the first precise feeding means 14 includes a power source 24, such as a servomotor, fixed to the base 12 by bolts (not shown) with buffer material like rubber disposed therebetween, and a U-shaped supporting block 26 similarly fitted to the base 12. A pair of horizontally positioned supporting bars 30, 31 are securely stretched across a pair of mutually facing upright walls 28, 29 of the U-shaped supporting block 26. These horizontally positioned supporting bars 30, 31 slidably support a substantially cross-shaped guide carriage 32. A driving shaft 34 of the servomotor 24 penetrates the central portion of the cross-shaped guide carriage 32. The extension end of the driving shaft 34 is rotatably supported by the upright wall 29. This driving or rotary shaft 34 should preferably be formed of a ball screw, and rotatably supports the guide carriage 32 by means of a ball housing 36. The one side ends of a pair of horizontally positioned guide bars or thrust bars 38, 39 are symmetrically fitted to the upper and lower portions of the ball housing 36. The other side ends of the guide bars 38, 39 are fitted to a connecting board 40 (FIG. 4) of the coupling means 22 through the upright wall 29.

Figure 2:
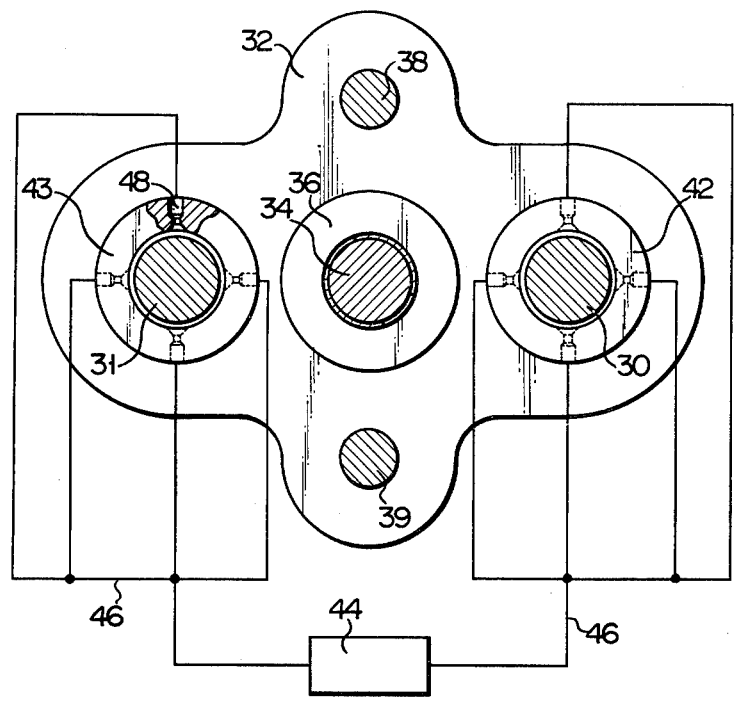
FIG. 2 is a cross sectional view on line II—II of FIG. 1.
Figure 3:
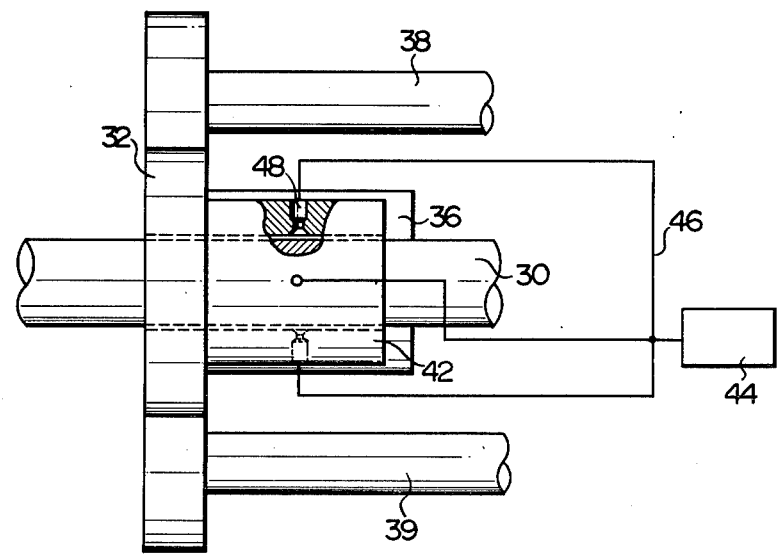
FIG. 3 is a front view of the main portion of a first precise feeding means.

The supporting bars 30, 31 fitted to the supporting block 26 have the peripheral surface finished with high precision. As apparent from FIGS. 2 and 3, the supporting bars 30, 31 floatingly support the guide carriage 32 by fluid bearings 42, 43 utilizing a pressurized fluid, for example, pressurized air. The pressurized fluid is ejected from a source 44 through a distribution pipe 46 and orifices 48 into a gap between the bearing section and horizontal thrust bars 38, 39 to provide a layer of static air in the gap. Therefore, the fluid bearings 42, 43 can support the supporting bars 30, 31 in contactless relationship.

The driving shaft 34 which, as previously mentioned, takes the form of a ball screw enables the guide carriage 32 to make a precise reciprocating movement. Further, this guide carriage 32 which is supported by the supporting bars 30, 31 in contactless relationship by means of the fluid bearings 42, 43 is saved from a stick slip and thermal deformation caused by a frictional force. When rotated, the ball screw imparts a torsional moment, though slight, to the guide carriage 32. Since the torsional moment is applied ununiformly, the guide carriage tends to make a minute rotation shakingly, giving rise to, for example, an irregular feeding or stick slip of a sample or workpiece in the Y-direction.

Since, however, the paired fluid bearings 42, 43 which are disposed in symmetrical relationship with respect to the driving shaft 34 render the shaft 34 sufficiently resistant to vibrations, the above-mentioned drawbacks of the ball screw is fully eliminated. Further, the guide carriage 32 can be located minutely with high precision. The orifices 48 of the fluid bearings 42, 43 has a tapered openings to reduce the force with which pressurized air is ejected.

Referring now to FIG. 4, one end of a connecting rod 52 is fixed to the connecting board 40 of the coupling means 22. A flange 54 which is preferably finished on both sides and peripheral surface is formed on the other end of the connecting rod 52. This flange 54 is supported by a fluid bearing 58 received in an inner housing 56, which in turn is movably set in an outer housing 60. The fluid bearing 58 comprises a pair of thrust bearings 62, 63 facing the lateral sides of the flanges 54 and one radial bearing 64 surrounding the periphery of the flange 54. The inner housing 56 is formed of two housing members 65, 66 connected to each other in airtightness. An output shaft 68 is bolted to one housing member 65. The outer housing 60 is formed of two housing members 70, 71 connected to each other in airtightness and mounted on the base 12. The outer housing 60 holds a pair of thrust bearings 72, 73 facing the lateral sides or peripheral surface of the inner housing 56 and one radial bearing 74. The bearings 72 to 74 jointly form a fluid bearing 76 for supporting the inner housing 56 in contactless relationship. The bearings 62 to 64 collectively forming the fluid bearing 58 are provided with numerous mutually facing orifices 78. Similarly, the bearings 72 to 74 constituting the fluid bearing 76 are provided with numerous mutually facing orifices 79. The orifices 78, 79 are supplied with pressurized air from the source 44 through distribution pipes (not shown). Pressurized air ejected from the orifices 78, 79 forms a static layer of air and supports the flange 54 of the connecting rod 52 and inner housing 56 in contactless relationship, that is, floatingly. Further, pressurized air flowing out into the atmosphere through gaps between the peripheral surfaces of the connecting rod 52 and output shaft 68 on one hand and the housings 56, 60 on the other forms a supplementary static layer of air for directly supporting the connecting rod 52 and output shaft 68 in contactless relationship. Further, numerous O-rings are provided in the housings 56, 60 to prevent the leakage of pressurized air.

As mentioned above, the connecting rod 52 is supported by the fluid bearing 58 in contactless relationship. The inner housing 56 receiving the fluid bearing 58 is held in the fixed outer housing 60 so as to be moved in the axial direction, and also supported by the fluid bearing 76 in contactless relationship. The output shaft 68 is fixed to the inner housing 56. Accordingly, the precise reciprocating movement of the connecting rod 52 is smoothly and accurately transmitted to the inner housing 56, namely, the output shaft 68 by means of a static layer of air formed on the lateral sides of the flange 54. The output shaft 68 is indirectly connected to the connecting rod 52 by means of the coupling means 22 of a double contactless bearing system utilizing the fluid bearings 58, 76. Therefore, vibrations, torsional moments or bending moments arising in the connecting rod 52 are absorbed in the fluid bearings 58, 76 and are not transmitted to the output shaft 68 at all.

The inner housing 56 is received in the outer housing 60 by being floatingly supported by the fluid bearing 76. A static layer of air formed by the fluid bearing acts as a damper, thereby assuring the smooth reciprocation of the inner housing 56 or the output shaft 68. The orifices 78, 79 have tapered openings to reduce the force with which pressurized air is ejected.

As apparent from FIG. 1, the Y-table 16 of the XY-table assembly 18 is slidably supported by a pair of supporting bars 82, 83 securely stretched between a pair of mutually facing upright blocks 80, 81. The systems of supporting the Y-table 16 by the supporting bars 82, 83 have the same construction. There will now be only described the supporting system of the supporting bar 83.

As best shown in FIG. 5, an annular passage 84 is formed in the Y-table 16. Numerous orifices 86 radially extend from the annular passage 84. These orifices 86 face each other to cause the Y-table 16 to be supported by the supporting bar 83 in completely parallel relationship. Two hoses 88 are connected to the Y-table 16 to conduct pressurized air into the annular passage 84. Therefore, pressurized air supplied to the annular passage 84 from the source 44 through the hoses 88 is ejected to the supporting bar 83 through the orifices 86 to provide a static layer of air between the supporting bar 83 and Y-table 16. The Y-table 16 is floatingly supported by such fluid bearing. The static layer of air has a uniform thickness in the axial direction of the supporting bar 83, though the thickness is ununiform in the radial direction of the bar 83. Therefore, the Y-table 16 is supported quite horizontally in the axial direction without being inclined in any way.

It will be noted that when floatingly supported by the supporting bar 83, the Y-table 16 does not take a concentric position relative to the bar 83. The reason is that the force with which the Y-table 16 is floated is defined by such factors as the pressure of compressed air and a load acting on the Y-table, and that as measured in the radial direction of the supporting bar 83, the lower portion of the static layer of air has a layer thickness than the upper portion. Where the static layer of air has a certain thickness, the Y-table is held in the most stable state. The static layer of air whose upper portion as measured in the radial direction of the supporting bar 83 has a smaller thickness indicates a prominent stability, namely, a great rigidity or resistance to a load by which the Y-table 16 is pressed downward. Since little change occurs in the abovementioned thickness pattern of the static layer of air, the Y-table 16 is little likely to be shifted downward. Yet, the Y-table 16 itself originally tends to be supported by the supporting bar 83 concentrically therewith. Therefore, the static layer of air has a small rigidity or resistance to a load by which the Y-table 16 is pushed upward, causing the Y-table 16 to be readily shifted upward.

Since the X-table 15 carrying a sample or workpiece is mounted on the Y-table 16, a bending moment is ready to be applied to the Y-table 16. Where a bending moment M acts in the directions of the arrows shown in FIG. 5, then the Y-table 16 tends to be shifted downward on the right side and upward on the left side. Since, in this case, the static layer of air indicates a strong resistance to a downward-acting load on the right side of the Y-table 16 for the aforesaid reason, the Y-table 16 little tends to be shifted downward on the right side. Yet the static layer of air has a small resistance to an upward acting load, causing the Y-table 16 to be pushed upward on the left side. As the result, the Y-table 16 as a whole tends to be inclined.

To prevent the inclination of the Y-table 16, a pair of adapters 90, 91 are fitted, as shown in FIG. 5, to the lateral sides of the Y-table 16. Since the adaptors 90, 91 have a horizontally symmetric shape, description is only given of the adapter 90. As seen from FIG. 6, the adapter 90 is made in the form of a fractional annular band. An orifice 92 is bored in the lowermost part of the inner peripheral wall of the adapter 90, whose upper portion is widely cut away. The adapter 90 well serves the purpose, provided it is so constructed as to cause pressurized air ejected through the orifice 92 to generate such a force as pushes the supporting bar 83 upward. The position and number of the orifice 92 and the shape of the adapter 90 itself are not limited to what is illustrated in FIG. 6. Pressurized air introduced into the adapter 90 from the source 44 through a feed pipe 94 is ejected through the orifice 92 to the lower peripheral surface of the supporting bar 83 and flows upward through the cut away portion and also lengthwise along the supporting bar 83. Since the supporting bar 83 is rigidly fixed to the upright blocks 80, 81, the adapter 90 is pressed downward by the reactionary force of ejected streams of pressurized air striking against the lower peripheral surface of the supporting bar 83. Therefore, the force of the falling left side adapter 90 which acts to bring down the left side of the Y-table 16 offsets the upward bending moment applied to the left side. As the result, the Y-table 16 is not inclined, even when the above-mentioned bending moment is applied to the left side thereof. Where the bending moment is applied in the opposite direction to the above-mentioned case, then the right side adapter is pressed downward to prevent the inclination of the Y-table 16 through the same process as described above.

Thus, the precise feeding of the guide carriage 32 is effected by the output shaft 68 through the supporting bars 38, 39. A force for the precise feeding of the guide carriage 32 is transmitted from the output shaft 68 through the supporting bars 38, 39. The Y-table 16 of the XY-table assembly 18 held by the supporting bars 82, 83 is prevented from being inclined by the action of the adapters 90, 91. Therefore, a sample, or workpiece can be precisely located by the XY-table assembly 18.

The X-table 15 mounted on the Y-table 16 is located by the second precise feeding means 20. As seen from FIG. 1, the second precise feeding means 20 includes a power source 100, such as a servomotor, fitted to the base 12 by an L-shaped fitting board 98. An output from the servomotor 100 is transmitted to a conversion mechanism 104 set on the Y-table 16 by means of a driving shaft 102.

The conversion mechanism 104 is formed of a worm gear assembly to make a minute rotation. An output shaft 106 receiving the minute rotation of the conversion mechanism 104 is connected to the X-table 15 at one end for its reciprocation on the Y-table 16. The output shaft 106 should preferably be formed of a ball screw to ensure the precise feeding of the X-table 15. The conversion mechaism 104 is shifted together with the Y-table 16 in the direction of the indicated Y-axis. The driving shaft 102 is connected to the conversion mechanism 104 by means of a ball spline 108 to transmit a rotating movement to the conversion mechanism 104, no matter how its position is changed.

Figure 7:
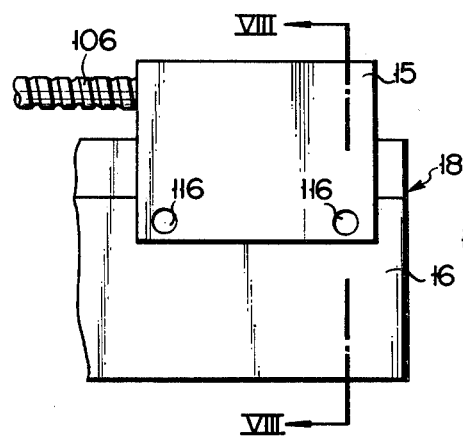
FIG. 7 is a fractional exploded side elevation of an XY-table assembly.
Figure 8:
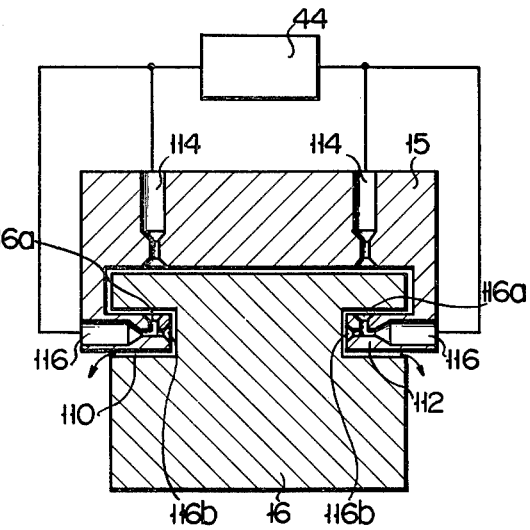
FIG. 8 is a cross sectional view on line VIII—VIII of FIG. 7.

The X-table 15 is floatingly supported on the Y-table 16 by means of a fluid bearing as shown in FIGS. 7 and 8. Both sides of the Y-table 16 are provided with an elongate groove extending in the direction of the X-axis in which the X-table 15 travels. The X-table 15 has an extending portion 112 loosely fitted into the elongate groove 110. The X-table 15 is bored with two pairs of vertically extending orifices 114 (only one pair is indicated). The extending portion 112 of the X-table 15 has horizontal orifices 116 whose openings 116a face the openings of the orifices 114. The orifices 116 further have openings 116b which face each other. These orifices 114, 116 have tapered openings. Pressurized air supplied from the source 44 through the orifices 114, 116 is introduced between the X-table 15 and Y-table 16 to provide a static layer of air therein. The X-table 15 is floatingly supported on the Y-table 16 by the static layer of air, and consequently can slide over the Y-table without a zigzag movement or stick slip. The output shaft 106 formed of a precision screw makes a minute rotation by the conversion mechanism 104 including a worm gear assembly. Therefore, the X-table 15 connected to one end of the output shaft 106 can be precisely located. Even when a bending moment arises from the rotation of the output shaft 106, neither the X-table 15 floatingly supported by fluid bearing on the Y-table, nor the Y-table 16 provided with the aforesaid adapters 90, 91 on both sides is inclined.

There will now be described by reference to FIG. 9 another coupling means modified from the previously described coupling means 22 of FIG. 4. The coupling means 122 of FIG. 9 has substantially the same construction as that of FIG. 4. The parts of FIG. 9 the same as those of FIG. 4 are denoted by the same numerals. The free end portion of the connecting rod 52 included in the coupling means 122 has a larger diameter. A flange 54 is fitted to the center of the larger diameter section of the connecting rod 52. The inner housing 56 receives a fluid bearing assembly 58 having four thrust-radial bearing 124 provided with substantially T-shaped orifices 78. These orifices 78 are open to the lateral sides of the flange 54 and the peripheral surface of the connecting rod 52. The fluid bearing assembly 58 further includes a radial bearing 64 surrounding the peripheral surface of the flange 54. According to the modification of FIG. 9, the fluid bearing 76 fitted to the outer housing 60 of FIG. 4 is received in the inner housing 56. The outer housing 60 of FIG. 9 has a bottomless cylindrical form. With the modification of FIG. 9, the fluid bearing 76 does not contain thrust bearings 72, 73. Pressurized air supplied from the source 44 enters the annular groove 128 of the inner housing 56 through the feed pipe 126. Part of the pressurized air leaving the annular groove 128 is ejected on the lateral sides of the flange 54 and the peripheral surface of the connecting rod 52 through the orifices 78 of the fluid bearing assembly 58 to provide a static layer of air. Part of the pressurized air is released directly into the atmosphere after passing along the peripheral surface of the connecting rod 52, also through an outlet pass 131 formed in the inner housing 56 and further through small radially extending orifices 129 formed in the connecting rod 52, axially extending orifices 130, and the outlet pass 131. The pressurized air forms a static layer of air also on the peripheral surface of the flange 54. Part of the pressurized air leaving the annular groove 128 is ejected into the outer housing 60 through the orifices 79 of the fluid bearing 76 to provide a static layer of air between the inner surface of the outer housing 60 and the outer surface of the inner housing 56.

Figure 9:
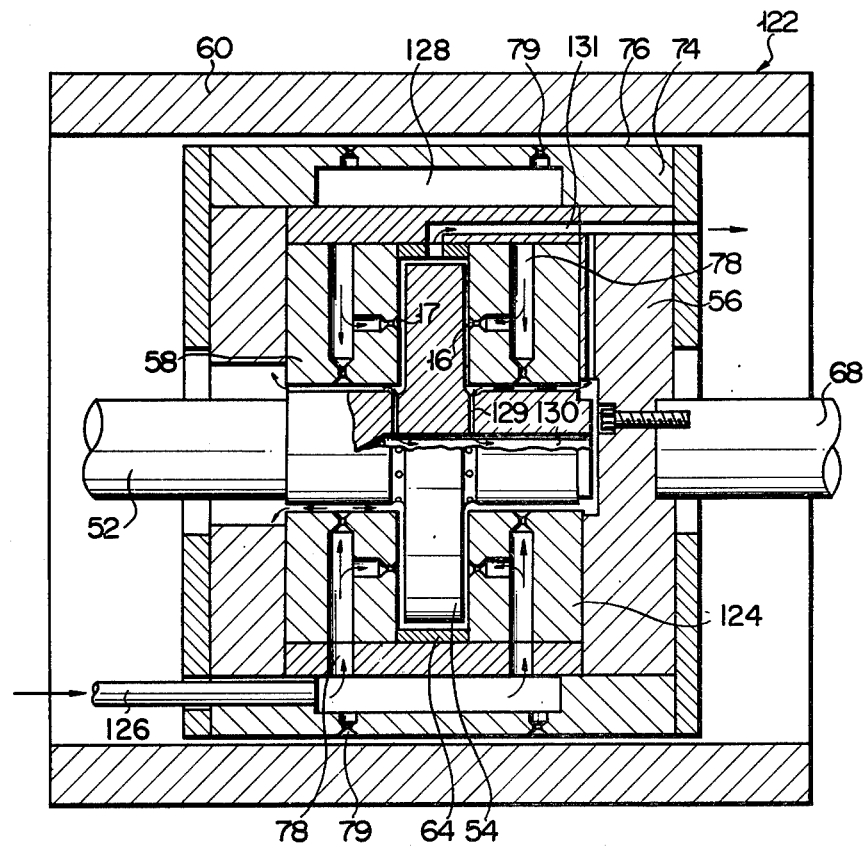
FIG. 9 is a longitudinal sectional view of coupling means modified from that of FIG. 4.

With the coupling means 122 of FIG. 9, static layers of air are formed positively and in symmetrical relationship on both sides of the flange 54 and also along the peripheral surface of the connecting rod 52. Therefore, the fluid bearing assembly 58 has a higher rigidity or resistance to a load applied to the X- and Y-tables 15, 16, thereby completely preventing, for example, the vibrations of the connecting rod 52 from being transmitted to the output shaft 68.

According to this invention, the rotating movement of a servomotor for the Y-table, which has been converted into a precise reciprocating movement is indirectly transmitted to the Y-table through coupling means preferably including a fluid bearing. Therefore, stick slips or vibration do not arise in the Y-table. Further, the thermal deformation of the prior art bearing does not arise at all in the fluid bearing used in the precise feeding table apparatus of the invention.

The known table apparatus presented difficulties in assuring feeding precision capable of limiting the horizontal and vertical displacements of a sample or workpiece to less than 1 micron per 10 cm feeding. With a table apparatus embodying this invention, however, the X-table can locate a sample or workpiece with such high feeding precision as limits the horizontal and vertical displacements of a sample or workpiece to ±0.25 micron and ±0.30 micron respectively per 80 cm feeding.

What we claim is:

1. A precise feeding table apparatus which comprises a base; first precise feeding means having precise reciprocating means, said reciprocating means including a driving shaft, first power source, a connecting rod whose free end is provided with a flange and a first conversion mechanism for converting the rotating movements of the driving shaft to a precise reciprocating movement of said connecting rod; an XY-table assembly including a Y-table reciprocating in the same direction as the reciprocating means of the first precise feeding means and an X-table mounted on the Y-table to be reciprocated in a direction perpendicular to that in which the Y-table is reciprocated; coupling means for transmitting the reciprocating movement of the reciprocating means of the first precise feeding means to the Y-table of the XY-table assembly, the coupling means including a first fluid bearing disposed around the flange of the connecting rod to support said rod in contactless relationship, an inner housing for receiving the first fluid bearing, an outer housing for receiving the inner housing to move it in the axial direction of the connecting rod, a second fluid bearing for supporting the inner housing in contactless relationship with the outer housing, and an output shaft connected at one end to the movable inner housing and at the other end to the Y-table, thereby transmitting a force for effecting the precise feeding of the Y-table by the first precise feeding means; and second precise feeding means including a second power source provided with a driving shaft and mounted on the base, second conversion means set on the Y-table to convert the rotating movement of a rotary shaft into a minute rotating movement and a rotatable output shaft, both ends of which are connected to the second conversion mechanism and X-table respectively, thereby supplying the X-table with a force for its precise feeding.

2. The table apparatus according to claim 1, wherein a layer of pressurized fluid is formed between the inner housing on one hand and both lateral sides and peripheral surface of the flange on the other, as well as between the peripheral surface of the connecting rod and the inner housing; and part of the pressurized fluid flows to the outside along the connecting rod.

3. The table apparatus according to claim 2, wherein a layer of pressurized fluid is formed along the peripheral surface of the connecting rod on both lateral sides of the flange in substantially the same length.

4. The table apparatus according to claim 3, wherein the first fluid bearing has an orifice open to the peripheral surface of the connecting rod.

5. The table apparatus according to claim 3, which further comprises XY-table assembly supporting means including at least two parallel supporting bars for slidably supporting the Y-table of the XY-table assembly and a fluid bearing for supporting the Y-table in contactless relationship with the supporting bars.

6. The table apparatus according to claim 5, wherein the XY-table assembly supporting means further includes a pair of adapters disposed on those sides of the Y-table which are perpendicular to the Y-axis of said Y-table, each of said adapter being provided with an orifice open to the lower peripheral surface of the supporting bar to eject pressurized fluid on to said surface.

7. The table apparatus according to claim 6, wherein the XY-table assembly supporting means further includes a fluid bearing for supporting the X-table in contactless relationship with the Y-table.

8. The table apparatus according to claim 2, which further comprises XY-table assembly supporting means including at least two parallel supporting bars for slidably supporting the Y-table of the XY-table assembly and a fluid bearing for supporting the Y-table in contactless relationship with the supporting bars.

9. The table assembly according to claim 8, wherein the XY-table assembly supporting means further includes a pair of adapters disposed on those sides of the Y-table which are perpendicular to the Y-axis of said Y-table, each of said adapters being provided with an orifice open to the lower peripheral surface of the supporting bar to eject pressurized fluid on to said surface.

10. The table apparatus according to claim 9, wherein the XY-table assembly supporting means further includes a fluid bearing for supporting the X-table in contactless relationship with the Y-table.

11. The table apparatus according to claim 10, wherein the fluid bearing for the X-table has at least two pairs of orifices whose openings face each other across part of the Y-table, one pair of said orifices being arranged in symmetrical relationship with the other pair relative to the Y-axis.

12. The table apparatus according to claim 11, wherein the second conversion mechanism of the second precise feeding means includes a worm gear assembly; and the output shaft of said second precise feeding means takes the form of a ball screw.

13. The table apparatus according to claim 9, wherein the driving shaft of the first precise feeding means takes the form of a ball screw; the first conversion mechanism of said first precise feeding means is provided with a guide carriage containing a ball housing for rotatably supporting the driving shaft; and the reciprocating means of said first precise feeding means further includes a connecting board fixed to the connecting rod and a pair of guide bars each connected at one end to the connecting board and at the other end to the guide carriage.

14. The table apparatus according to claim 13, wherein the first precise feeding means further includes a first conversion mechanism provided with a pair of supporting bars for slidably supporting the guide carriage, and fluid bearings fitted to the guide carriage to support it in contactless relationship with the supporting bars.

* * * * *